June 8, 1943.  J. H. HAMMOND, JR  2,321,026
PROPELLER CONTROL MECHANISM
Filed Oct. 10, 1941    2 Sheets-Sheet 1

INVENTOR
JOHN HAYS HAMMOND, JR
BY
ATTORNEY

June 8, 1943.  J. H. HAMMOND, JR  2,321,026
PROPELLER CONTROL MECHANISM
Filed Oct. 10, 1941                2 Sheets-Sheet 2

INVENTOR
JOHN HAYS HAMMOND, JR.
BY
ATTORNEY

Patented June 8, 1943

2,321,026

UNITED STATES PATENT OFFICE 2,321,026

PROPELLER CONTROL MECHANISM

John Hays Hammond, Jr., Gloucester, Mass.

Application October 10, 1941, Serial No. 414,489

5 Claims. (Cl. 170—163)

This invention relates to variable pitch propellers and more specifically to means for automatically varying the pitch of a propeller so as to maintain the speed of a vessel constant under varying conditions of wind and weather.

The invention further relates to distance indicating means operated by the motion of the vessel through the water which directly controls means for varying the pitch of the propeller blades in such a way that the power supplied to the propeller is varied so as to maintain the vessel at a predetermined speed.

The invention also provides means for varying the rate of change of pitch of the propeller blades in accordance with the rate of change of the vessel's speed, thus preventing rapid changes of pitch of the propeller blades which might cause unnecessary strain and vibration on the driving machinery.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages the mode of its operation and the manner of its organization, may be better understood by referring to the following description, taken in connection with the accompanying drawings forming a part thereof, in which Figure 1 illustrates diagrammatically the system as applied to the driving mechanism of a marine vessel;

Like reference characters denote like parts in the several figures of the drawings.

In the following description and in the claims parts will be identified by specific names for convenience, but they are intended to be as generic in their application to similar parts as the art will permit.

Figure 1:
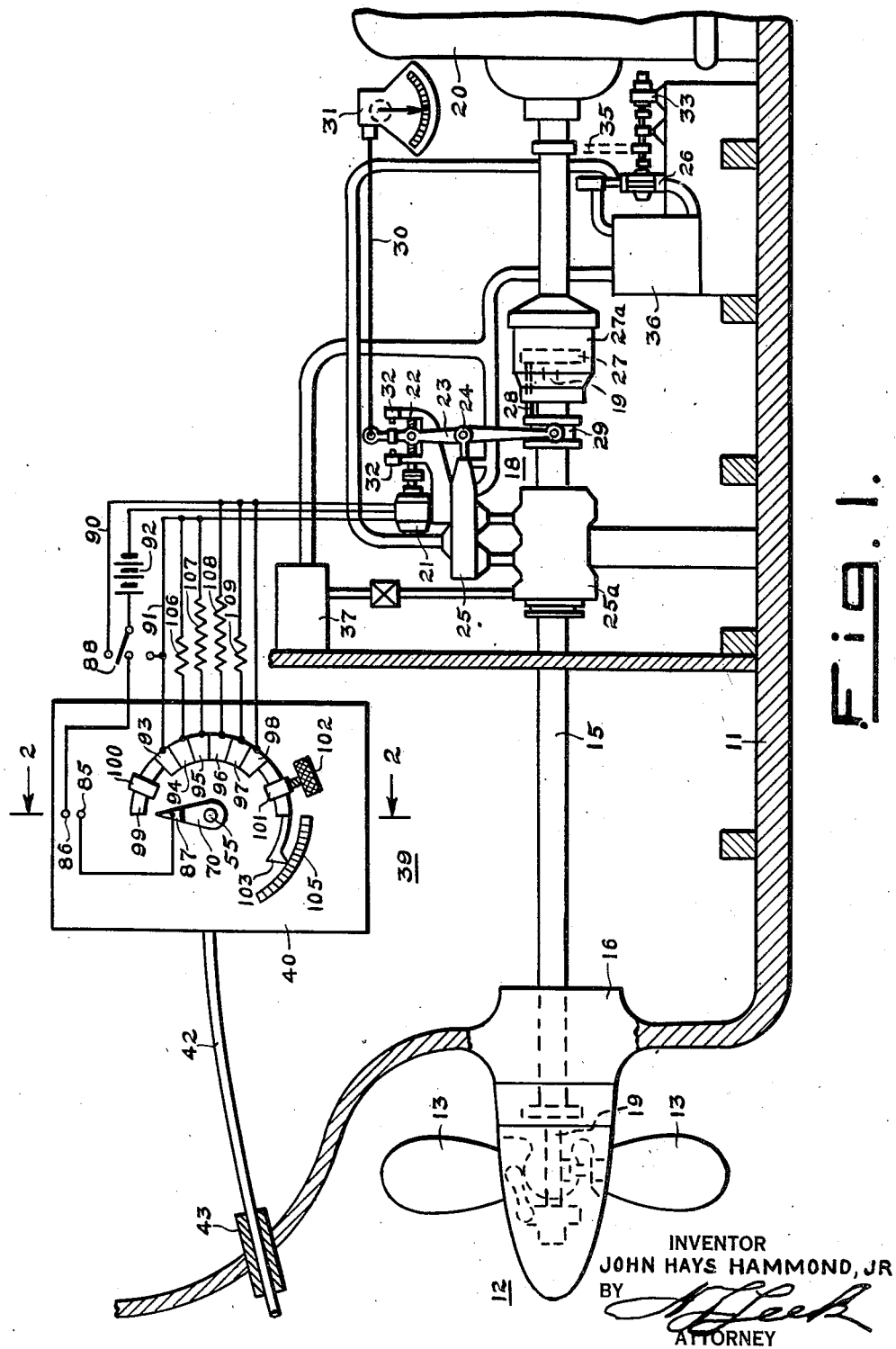
Figure 3:
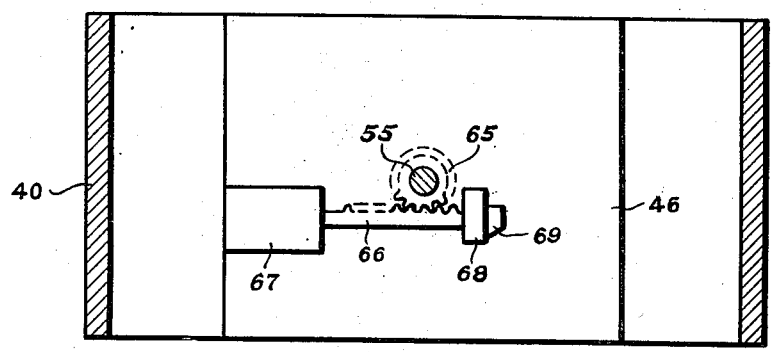
Figure 3 is a horizontal section taken on line 3—3 of Figure 2.

Referring to the accompanying drawings, and more particularly to Figure 1, the hull of a marine vessel is indicated at 11. This vessel is driven by means of a propeller 12 which is provided with adjustable blades 13. The propeller 12 is attached to the end of a hollow shaft 15 which passes through an outboard bearing 16 The shaft 15 is driven by a prime mover 20 which may be of any desired type and is preferably provided with a governor, not shown, for maintaining a constant speed of rotation.

The blades 13 are connected to a variable pitch mechanism 18 which may be of any well known and standard construction such as that manufactured by the Escher-Wyss Company of Zurich, Switzerland, the details of which form no part of the present invention and are accordingly not specifically set forth herein. This mechanism, in general, comprises a rod 19 slidable longitudinally within the shaft 15 and connected to control the pitch of the blades 13. The rod 19 is actuated by a piston 27 in a fluid pressure cylinder 27a. Fluid for actuating the piston 27 is supplied by a pump 26 through a control valve 25 and a distribution valve 25a which communicates with the cylinder 27a through ducts, not shown, in the shaft 15. A motor 21 rotates a worm 22 which operates to move the upper end of a floating lever 23, which, in turn, is pivoted to the end of a valve rod 24 which controls the valve 25. The piston 27 is connected by a rod 28 to a collar 29 which is slidably mounted on the shaft 15 and engages the lower end of the lever 23 so that the position of this end of the lever corresponds to the pitch of the blades 13.

The upper end of the lever 23 is connected by a wire 30 to an indicator 31 which shows the pitch at which the blades 13 are set. Stops 32 are provided for limiting the maximum and minimum pitch of the blades 13. The fluid pump 26 is driven either by a motor 33 or a belt 35 from the shaft 15. A reservoir 36 and a supply tank 37 are provided for the necessary fluid.

It is to be understood that other pitch control devices may be employed in place of that referred to above, for varying the pitch of the propeller blades 13 in response to actuation of the motor 21. A particular type is shown for purposes of illustration only.

A distance recorder 39 is provided which includes a frame 40 in which is mounted a standard type of ship's log mechanism 41 (Figure 2) which is driven by means of a cable 42, which passes outboard thru a stuffing box 43 mounted in the hull 11. The usual ship's log propeller, not shown, is attached to the end of the cable 42 and causes this cable to rotate an amount proportional to the distance travelled by the vessel.

The ship's log mechanism 41, which is of well known and standard construction and which need not be more fully described herein, is provided with a shaft 45 which is rotated an amount proportional to the distance travelled by the vessel. For example the normal speed of the vessel may be 24 knots per hour and the shaft 45 may make one revolution in twenty minutes, so that one revolution of the shaft 45 would represent a distance of eight knots.

Mounted on the log mechanism 41 is a sub-frame 46 which is provided with a lug 47 to which is pivoted a yoke shaped arm 48. Pivotally connected to the arm 48 is the plunger of a solenoid 50, which is mounted on the frame 46. A pin 51 is mounted on the top of the log mechanism 41 and acts to limit the downward motion of the arm 48. Pivotally mounted at the end of the yoke shaped arm 48 is a collar 52 which loosely surrounds a cylindrical clutch member 53, which is secured to the shaft 45.

Rotatably mounted in the frame 40 and sub-frame 46 is a shaft 55 on the lower end of which a collar 56 is slidably but not rotatably mounted. The collar 56 is provided with a groove 57 which is loosely engaged by two pins 58 mounted in the end of a second yoke shaped arm 59, which is pivoted to a lug 60 secured to the frame 46. Pivotally connected to the arm 59 is the plunger of a solenoid 61, which is mounted on the sub-frame 46.

Surrounding the shaft 55 and secured to the sub-frame 46 is a thrust ball bearing 62 between which and the collar 56 is mounted a compression spring 63. Secured to the shaft 55 is a gear 65 which meshes with a rack 66, which forms part of the core of a solenoid 67. The rack 66 is slidably mounted in a bracket 68 and is provided on its end with a projection 69 forming a stop to limit the motion of the rack. Secured to the upper end of the shaft 55 is an arm 70.

Mounted on the base of the frame 40 is a driving mechanism 71, which is provided with a shaft 72, which may be driven at a constant speed, for example, one revolution in twenty minutes. Attached to the shaft 72 are two commutators 73 and 74 which are made of insulating material and are provided with two contact segments 75 and 76 respectively. Engaging the commutator 73 are three contacts 77, 78 and 79. The contact 77 is connected to one side of the winding of the solenoid 50, the other side of which is connected thru a battery 80 to the contact 78. The contact 79 is connected to one side of the windings of the solenoids 61 and 67 the other sides of which are connected to the battery 80.

The commutator 74 is engaged by two contacts 81 and 82 which are connected to two terminals 85 and 86. The terminal 85 is connected to a contact 87 which is mounted on but insulated from the arm 70, and the terminal 86 is connected to the center point of a three position switch 88 (Figure 1). The upper and lower points of the switch 88 are connected respectively by two conductors 90 and 91 to the reversing windings of the motor 21. The common lead of the reversing windings of the motor 21 is connected to one side of a battery 92 the other side of which is connected to the blade of the switch 88.

The contact 87 selectively engages six segments 93—98 which are mounted on but insulated from an arc-shaped member 99, which is slidably mounted in two brackets 100 and 101 mounted on the frame 40. A clamping screw 102 is provided in the bracket 101 for holding the member 99 in any desired position. A pointer 103 is secured to the member 99 and registers with a scale 105 which is attached to the frame 40 and which may be graduated in knots.

The segments 93 and 98 are connected by flexible conductors to the conductors 91 and 90 respectively. The segments 94 and 95 are connected by flexible conductors to two resistors 106 and 107, the other ends of which are connected to the conductor 91. The segments 96 and 97 are connected by flexible conductors to two resistors 108 and 109, the other ends of which are connected to the conductor 90.

*Operation*

In the operation of the form of the invention shown the pitch of the blades 13 is set at the normal operating angle for the speed at which it is desired to operate the vessel, which for example may be 24 knots. The setting of the propeller blades 13 is accomplished by moving the blade of the switch 88 into the upper or lower position which will cause the motor 21 to move the upper end of the lever 23 to the left or right to increase or decrease the pitch in a well known manner, the angle of pitch being indicated by the pointer of the indicator 31.

The vessel is then brought up to the desired speed in this case 24 knots per hour and the member 99 is moved until the pointer 103 indicates 24 knots on the scale 105. The screw 102 is then tightened holding the member 99 and segments 93—98 in the proper position for this speed.

The mechanism operates in cycles of, for example, 20 minutes and is shown at the start of one of these cycles. The arm 70 and contact 87 are in the zero position and have just been clutched to the shaft 45 of the ship's log mechanism 41. As the vessel proceeds through the water the cable 42 is rotated in the usual manner by the ship's log propeller, not shown, and in turn operates the mechanism 41 which slowly rotates the shaft 45 an amount proportional to the distance the vessel travels. This motion is transmitted thru the clutch 53—56 to the shaft 55 which in turn rotates the arm 70 and contact 87 by the same amount.

At the same time the shaft 72 is slowly rotated at the rate of one revolution in the 20 minute cycle. At the end of a fifteen minute integrating period the shaft 72 together with the commutators 73 and 74 will have rotated thru three-quarters of a revolution so that the segment 75 will engage the contacts 77 and 78. This will close a circuit from the battery 80 through the solenoid 50 thus energizing this solenoid causing it to raise the arm 48 together with the collar 52. As the collar 52 moves upward it will engage the collar 56 lifting it out of engagement with the clutch member 53. This will immediately stop the rotation of the shaft 55 and hold it, together with the arm 70 and contact 87, in a fixed position.

After the shaft 72 rotates slightly further, for example, about two degrees more, the segment 76 will engage the contacts 81 and 82 which will put the pitch setting mechanism into an operative condition. If during the 15 minute integrating interval the vessel has maintained its speed constant at 24 knots it will have travelled 6 knots and the shaft 55 will have rotated three-quarters of a revolution in a counterclockwise direction. Under these conditions the contact 87 will come to rest on the insulation between the segments 95 and 96 and the pitch setting mechanism will not be operated.

If the conditions under which the vessel is travelling should change, however, such as by encountering a strong head wind or running into a heavy sea and the speed of the vessel be thereby diminished the log mechanism 41 will not have rotated the shaft 45 by a full three-quarters of a revolution during the stated interval, so that the contact 87 will engage the segment 96 instead of the insulation between the segments 95 and 96. This will close a circuit from the battery 92 thru the resistor 108 to the motor 21 causing it to rotate slowly in a direction to move the upper end of the lever 23 to the left, for example. This will move the valve 24 to the left, which will allow fluid under pressure to pass from the pump 26 to the cylinder 27a by means of the ducts in the shaft 15. This will actuate the piston 27 which, by means of a rod 19 and the link mechanism, will cause the propeller blades 13 to slowly increase their pitch. This will cause more power to be transmitted from the prime mover 20, the R. P. M. being maintained constant by means of the governor, thereby increasing the speed of the vessel.

This slow increase of propeller pitch continues for a two minute operating interval during which the shaft 72 rotates thru about 36 degrees. The circuit is then broken between the contacts 81 and 82, thus putting the pitch setting mechanism into an inoperative condition. After the shaft 72 has made a further revolution of, for example, about two degrees, the segment 75 will engage the contact 79 closing a circuit from the battery 80 to the two solenoids 61 and 67. When the solenoid 61 is energized it will raise the collar 56 causing it to disengage the collar 52, so that the shaft 55, arm 70 and contact 87 will be free from both the clutch member 53 and the collar 52. When the solenoid 67 is energized it will cause the rack 66 to be moved to the left, which will rotate the gear 65 and shaft 55 in a clockwise direction until the projection 69 engages the bracket 68. When this has occurred the arm 70 and contact 87 will be reset in their zero position as shown in Figure 1.

Figure 2:
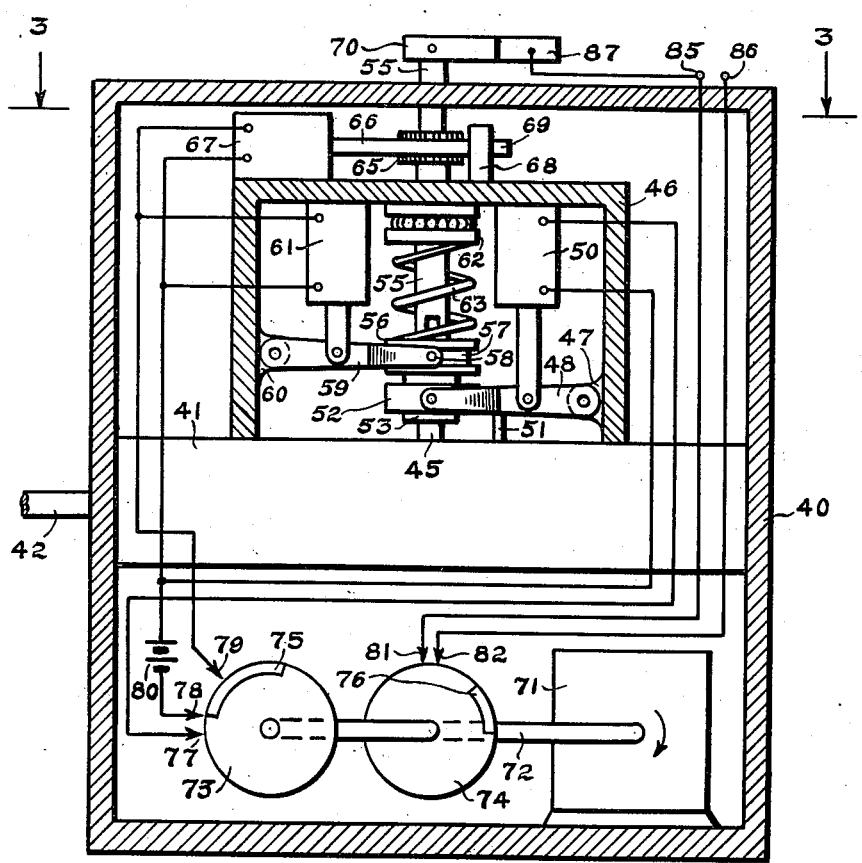
Figure 2 is a vertical section taken on line 2—2 of Figure 1.

After the shaft 72 has rotated a further 46 degrees, the segment 75 will disengage the contact 77, thus opening the circuit to the solenoid 50. This will allow the arm 48 and collar 52 to move downward until the arm 48 rests on the pin 51 at which time the top of the collar 52 will be below the top of the clutch member 53 as shown in Figure 2.

A further revolution of about four degrees of the shaft 72 will cause the segment 75 to disengage the contact 78, thus breaking the circuit to the solenoids 61 and 67. This will allow the arm 59 and collar 56 to move downwardly under the action of the spring 63 until the collar 56 engages the clutch member 53. This action will connect the shaft 45 to the shaft 55 and will complete the twenty minute cycle of operation. The mechanism is now in the position shown in Figures 1 and 2 and is at the start of a new cycle.

If during the fifteen minute integrating interval the conditions had been more adverse, the contact 87 would have been in engagement with the segment 97 at the time the pitch setting mechanism was put into the operative condition. Under these circumstances the resistor 109 would be thrown in the circuit of the motor 21. As the resistor 109 has less resistance than the resistor 108 the motor 21 would be rotated faster thus causing a greater change of pitch in the two minute operating interval.

If during the fifteen minute integrating interval the conditions had been even more unfavorable the contact 87 would have engaged the segment 98 and no resistance would have been thrown in the circuit of the motor 21, so that the pitch changing mechanism would have been operated at its maximum speed during the two minute operating period.

If the vessel should increase its speed due to a following wind or other favorable conditions, the shaft 55 together with the contact 87 would make more than three-quarters of a revolution in the fifteen minute integrating interval. Under these conditions the contact 87 would engage one of the segments 95, 94, or 93 and the reverse action would take place, thus causing a decrease of propeller pitch during the two minute operating period. The speed of operation of the pitch changing mechanism would vary with the increase of speed during the fifteen minute integrating period in a manner similar to that already described.

In this way the pitch of the propeller blades 13 is varied every fifteen minutes an amount proportional to the integrated variation of speed from normal during this period. The propeller pitch is thus varied to cause the propeller to draw the required power from the prime mover 20 to maintain the speed of the vessel constant. The amount that the pitch is changed during the two minute operating interval will depend upon the change of speed of the vessel during the preceding fifteen minute period. If the change of pitch during one two minute operating interval does not exactly correct the condition, a further correction will be made at the end of the next fifteen minute integrating period. In this way the propeller pitch is gradually corrected for changed average operating conditions and is not continually fluctuating due to sporadic changes of the vessel's speed.

It is to be understood that while specific intervals of time and angles of operation have been referred to in the specification the invention is not limited thereto but may cover any embodiment that accomplishes substantially the same result.

Although only a few of the various forms in which this invention may be embodied have been shown herein, it is to be understood that the invention is not limited to any specific construction but may be embodied in various forms without departing from the spirit of the invention or the scope of the appended claims.

What is claimed is:

1. In a system for driving a vessel, a propeller having blades, means controlling the pitch of said blades, means measuring the distance travelled by said vessel in a predetermined time interval, and means actuated by said last means, in accordance with the distance travelled during said predetermined time interval, to actuate said pitch control means in a direction and by an amount dependent upon the direction and amount of variation of distance travelled from a predetermined standard and to cause said pitch control mechanism to change the pitch of said blades in a direction and by an amount to compensate for said variations in the distance travelled, whereby said vessel tends to maintain said standard.

2. The system set forth in claim 1 in which the propeller is operated at constant speed.

3. In a system for driving a vessel, a propeller having blades, means controlling the pitch of said blades, means responsive to the speed of travel of said vessel, an integrating device actuated by said speed control means to integrate the distance travelled over a predetermined period of time, and means controlled by said integrating means to actuate said pitch control means for predetermined intervals of time and at speeds corresponding to variations in the integrated distance from a predetermined standard distance which would be travelled under normal conditions of operation.

4. The system set forth in claim 1 in which the distance device comprises a ship's log.

5. In a system for driving a vessel, a propeller having blades, means driving said propeller at a constant speed, pitch control means controlling the pitch of said blades, a ship's log having means connected to designate the distance travelled by said ship, means comparing said designated distance with a predetermined standard distance to determine the direction and amount of deviation therefrom, and means actuated by said last means in accordance with said deviation to actuate said pitch control means in a direction and by an amount dependent upon the direction and amount of said deviation to cause said pitch control means to change the pitch of said blades in a manner to compensate for said deviations whereby said vessel tends to maintain said standard.

JOHN HAYS HAMMOND, JR.